United States Patent
Inoue et al.

(10) Patent No.: US 10,369,746 B2
(45) Date of Patent: Aug. 6, 2019

(54) THREE-DIMENSIONAL DATA GENERATION DEVICE, THREE-DIMENSIONAL SHAPING DEVICE, AND SHAPED OBJECT SHAPING METHOD

(71) Applicant: FUJI XEROX CO., LTD., Tokyo (JP)

(72) Inventors: Tetsuhiro Inoue, Kanagawa (JP); Masaomi Sakamoto, Kanagawa (JP); Fumihiko Ogasawara, Kanagawa (JP); Osamu Yasui, Kanagawa (JP); Yosuke Tashiro, Kanagawa (JP); Shinya Miyamori, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 118 days.

(21) Appl. No.: 15/612,019

(22) Filed: Jun. 2, 2017

(65) Prior Publication Data

US 2018/0009169 A1 Jan. 11, 2018

(30) Foreign Application Priority Data

Jul. 8, 2016 (JP) .................................. 2016-135986

(51) Int. Cl.
*G05B 19/4099* (2006.01)
*B29C 64/386* (2017.01)
*B33Y 50/00* (2015.01)

(52) U.S. Cl.
CPC ............ *B29C 64/386* (2017.08); *B33Y 50/00* (2014.12); *G05B 19/4099* (2013.01); *G05B 2219/49023* (2013.01)

(58) Field of Classification Search
CPC ... B29C 64/386; B33Y 50/00; G05B 19/4099; G05B 2219/49023

USPC .......................................................... 700/98
See application file for complete search history.

(56) References Cited

U.S. PATENT DOCUMENTS

| | | | | |
|---|---|---|---|---|
| 4,894,606 A | * | 1/1990 | Paur | G01R 31/2805 174/266 |
| 2007/0076577 A1 | * | 4/2007 | Furuichi | G02F 1/13452 369/275.4 |
| 2010/0176539 A1 | | 7/2010 | Higashi et al. | |
| 2017/0165918 A1 | * | 6/2017 | Yuji | G05B 19/4099 |
| 2017/0182714 A1 | * | 6/2017 | Sato | B33Y 10/00 |

FOREIGN PATENT DOCUMENTS

JP          2009-107153 A      5/2009

* cited by examiner

*Primary Examiner* — Chun Cao
(74) *Attorney, Agent, or Firm* — Sughrue Mion, PLLC

(57) ABSTRACT

A three-dimensional data generation device includes a data division unit, a detection unit, an output command unit, and a data correction unit. The data division unit divides sectional shape data on one layer of a shaped object into mark data for shaping a mark for correction of sectional shape data on a different layer to be output as superposed on the one layer and post-removal data obtained by removing the mark data from the sectional shape data on the one layer. The detection unit detects an amount of misregistration of the mark output using the mark data from a position determined in advance. The output command unit commands output using the post-removal data so as to form the one layer of the shaped object together with the mark. The data correction unit corrects the sectional shape data on the different layer using the amount of misregistration of the detected mark.

8 Claims, 11 Drawing Sheets

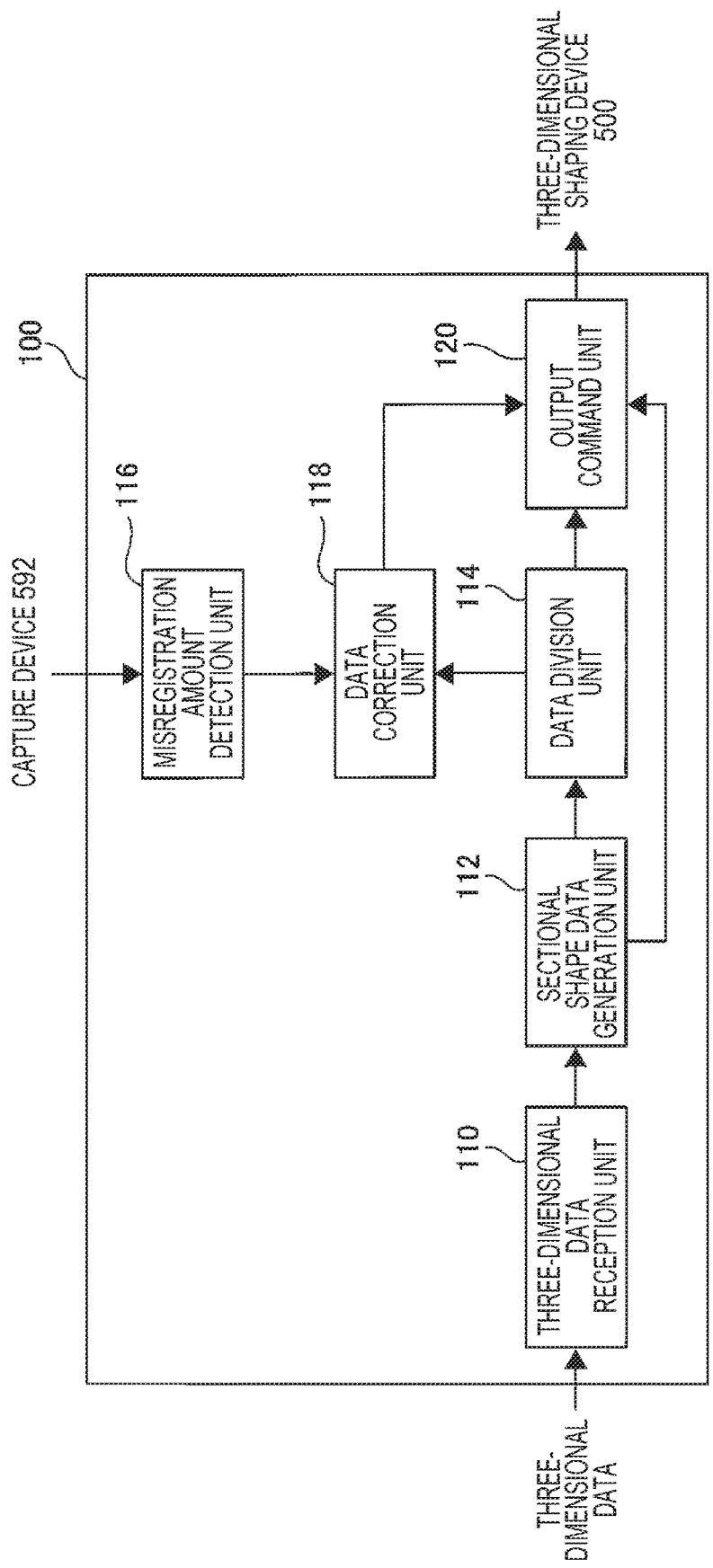

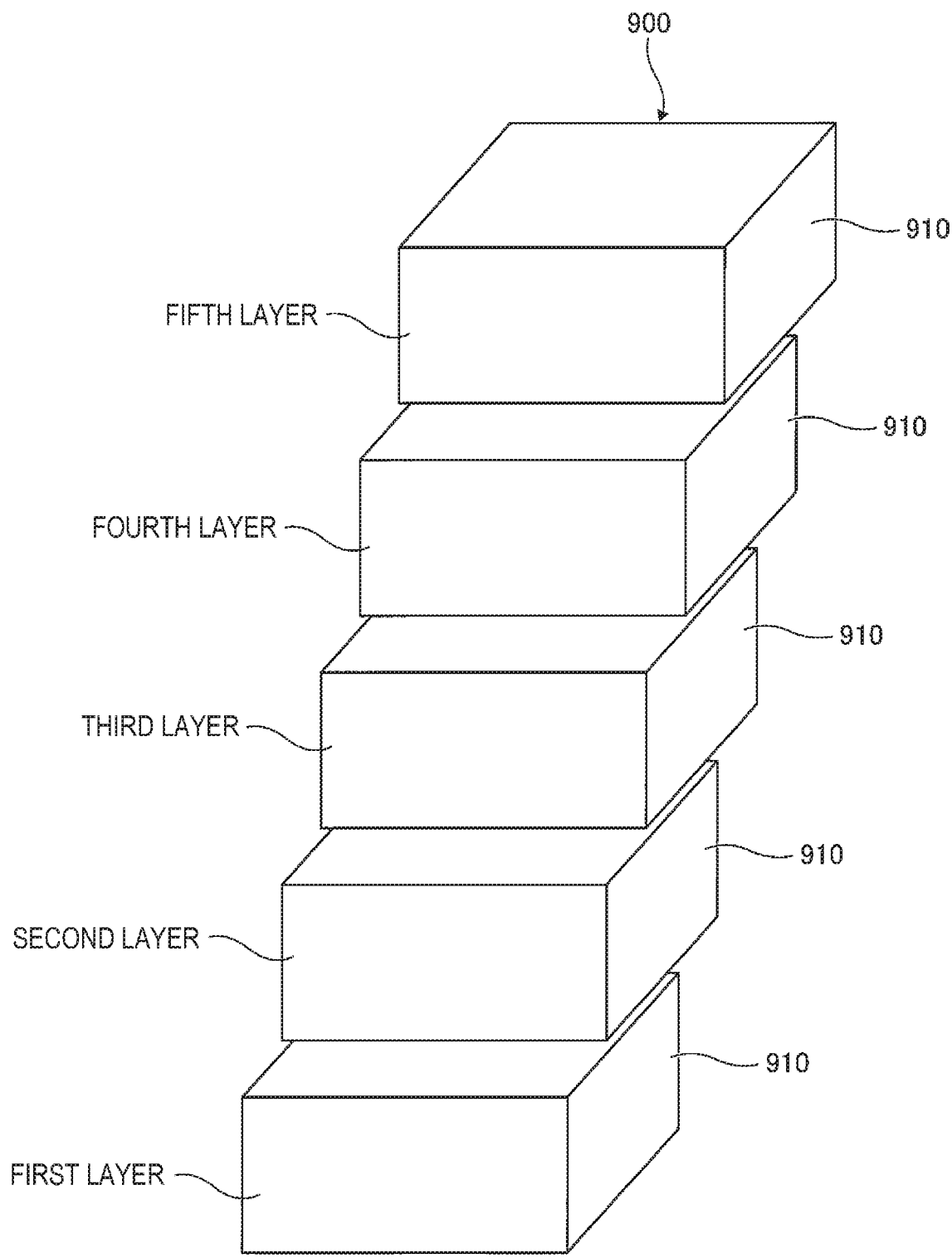

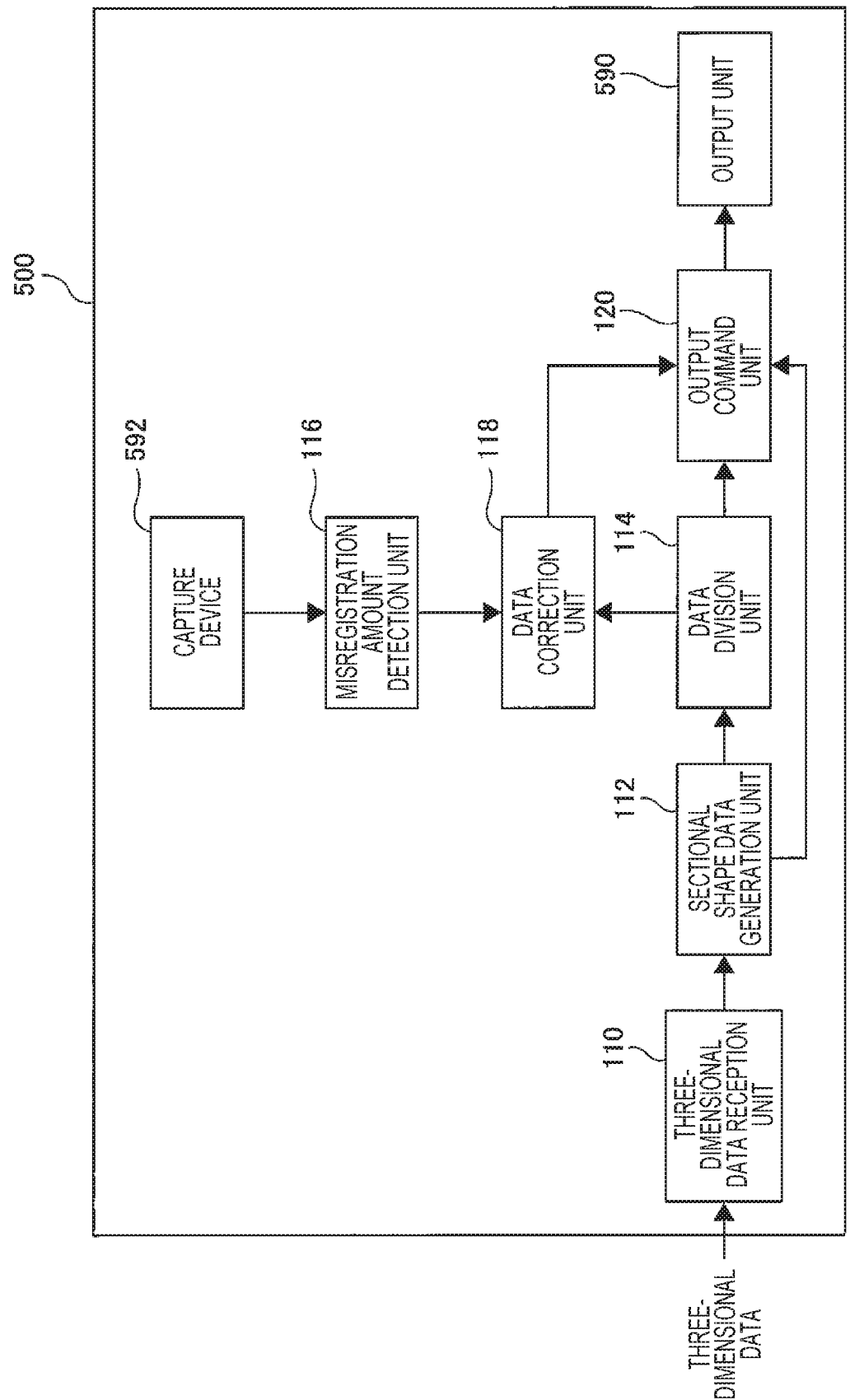

THREE-DIMENSIONAL DATA GENERATION DEVICE, THREE-DIMENSIONAL SHAPING DEVICE, AND SHAPED OBJECT SHAPING METHOD

CROSS-REFERENCE TO RELATED APPLICATIONS

This application is based on and claims priority under 35 USC 119 from Japanese Patent Application No. 2016-135986 filed Jul. 8, 2016.

BACKGROUND

Technical Field

The present invention relates to a three-dimensional data generation device, a three-dimensional shaping device, and a shaped object shaping method.

SUMMARY

According to an aspect of the present invention, there is provided a three-dimensional data generation device including: a data division unit that divides sectional shape data on one layer of a shaped object into mark data for shaping a mark for correction of sectional shape data on a different layer to be output as superposed on the one layer and post-removal data obtained by removing the mark data from the sectional shape data on the one layer; a detection unit that detects an amount of misregistration of the mark output using the mark data from a position determined in advance; an output command unit that commands output using the post-removal data so as to form the one layer of the shaped object together with the mark; and a data correction unit that corrects the sectional shape data on the different layer using the amount of misregistration of the mark detected by the detection unit.

BRIEF DESCRIPTION OF THE DRAWINGS

Exemplary embodiments of the present invention will be described in detail based on the following figures, wherein:

FIG. 5 is a block diagram illustrating the functional configuration of a data generation device illustrated in FIG. 1;

FIG. 9 illustrates a first example of the shaped object shaped by the three-dimensional shaping system illustrated in FIG. 1;
FIG. 11 is a block diagram illustrating the functional configuration of a three-dimensional shaping device of a three-dimensional shaping system according to a second exemplary embodiment of the present invention.

DETAILED DESCRIPTION

Figure 1:
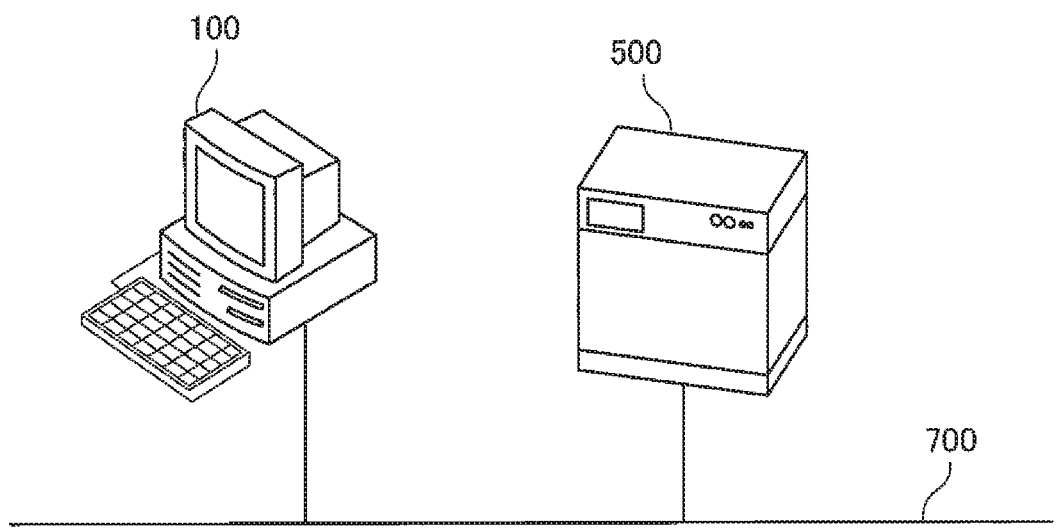
FIG. 1 illustrates a three-dimensional shaping system according to a first exemplary embodiment of the present invention.

Now, exemplary embodiments of the present invention will be described with reference to the drawings. FIG. 1 illustrates a three-dimensional shaping system 10 according to a first exemplary embodiment of the present invention. The three-dimensional shaping system 10 includes a data generation device 100 and a three-dimensional shaping device 500. The data generation device 100 and the three-dimensional shaping device 500 are connected to a network 700.

In the three-dimensional shaping system 10, the data generation device 100 generates three-dimensional data, the generated three-dimensional data are transmitted to the three-dimensional shaping device 500 via the network 700, and the three-dimensional shaping device 500 shapes a shaped object 900 (see FIG. 2, for example) on the basis of the transmitted three-dimensional data.

A personal computer, for example, may be used as the data generation device 100. The data generation device 100 and the three-dimensional shaping device 500 will be discussed in detail later.

Figure 2:
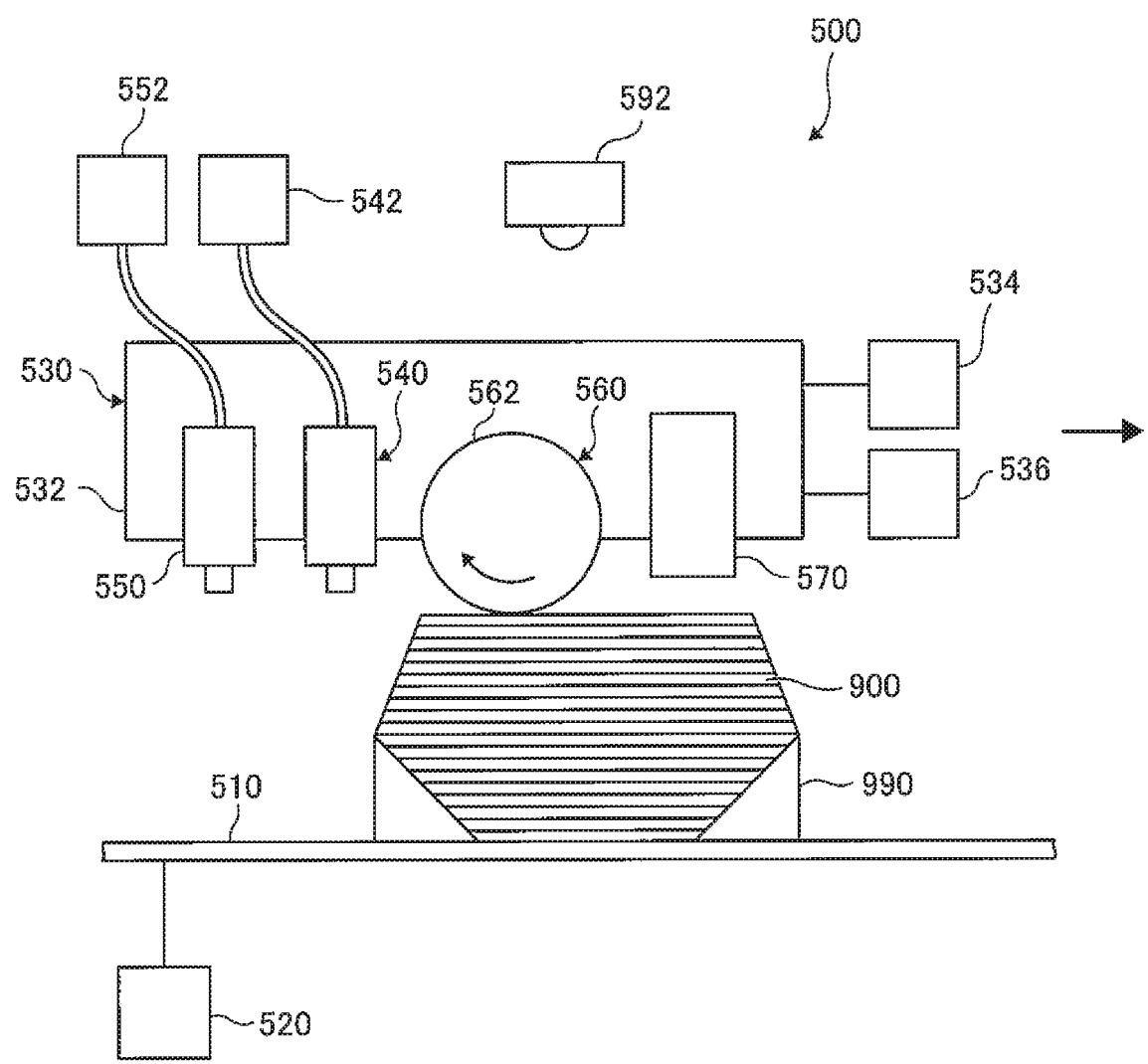
FIG. 2 illustrates a three-dimensional shaping device of the three-dimensional shaping system illustrated in FIG. 1.

FIG. 2 illustrates the three-dimensional shaping device 500. The three-dimensional shaping device 500 adopts a so-called inkjet system, more particularly a so-called inkjet ultraviolet (UV)-curable laminate shaping system. In the following description, the inkjet UV-curable laminate shaping system is adopted for the three-dimensional shaping device 500. However, the three-dimensional shaping device 500 may adopt other systems. That is, the three-dimensional shaping device 500 may adopt a thermal dissolution lamination system referred to also as fused deposition modeling (FDM), a powder sintering system referred to also as selective laser sintering (SLS), a powder securing system, a plaster lamination system, a photo-shaping system referred to also as stereo lithography (STL), a sheet material lamination system referred to also as laminated object manufacturing (LOM), or the like, for example.

As illustrated in FIG. 2, the three-dimensional shaping device 500 includes a shaping stage 510. In the three-dimensional shaping device 500, the shaped object 900 is shaped by laminating a shaping material on the upper surface of the shaping stage 510. In addition, a support material is laminated as necessary on the upper surface of the shaping stage 510 to shape a support material lamination section 990.

The support material lamination section 990 is formed to support the shaped object 900 from the lower side in the case where the shaping material is not laminated on the lower side of a portion of the shaped object 900. The support material lamination section 990 may be removed from the shaped object 900 by washing with water or the like, for example, after the shaped object 900 is shaped.

A Z-axis direction movement mechanism 520 is coupled to the shaping stage 510. The shaping stage 510 is movable in the Z-axis direction (vertical direction) by driving the Z-axis direction movement mechanism 520.

The three-dimensional shaping device 500 includes a head portion 530. The head portion 530 includes a head portion body 532. An X-axis direction movement mechanism 534 is coupled to the head portion body 532. The head portion 530 is movable in the X-axis direction (left-right direction in FIG. 2) by driving the X-axis direction movement mechanism 534. A Y-axis direction movement mechanism 536 is also coupled to the head portion body 532. The head portion 530 is movable in the Y-axis direction (the direction which crosses the sheet surface of FIG. 2) by driving the Y-axis direction movement mechanism 536.

The head portion 530 further includes a shaping material emission nozzle 540. The shaping material emission nozzle 540 emits the shaping material, which is stored in a shaping material storage section 542, toward the shaping stage 510. A photocurable resin may be used as the shaping material.

The head portion 530 further includes a support material emission nozzle 550. The support material emission nozzle 550 emits the support material, which is stored in a support material storage section 552, toward the shaping stage 510.

The head portion 530 includes a smoothing device 560. The smoothing device 560 smoothes the shaping material and the support material which are emitted toward the shaping stage 510. The smoothing device 560 includes a rotary member 562 that rotates to scrape off an excessive amount of the shaping material and an excessive amount of the support material, for example.

The head portion 530 includes a light irradiation device 570. The light irradiation device 570 irradiates light to cure the shaping material which has been emitted toward the shaping stage 510, and to cure the support material which has been emitted toward the shaping stage 510.

The three-dimensional shaping device 500 further includes a capture device 592. The capture device 592 is disposed so as to be able to capture the shaped object 900 being shaped from above the shaped object 900, for example.

Figure 3:
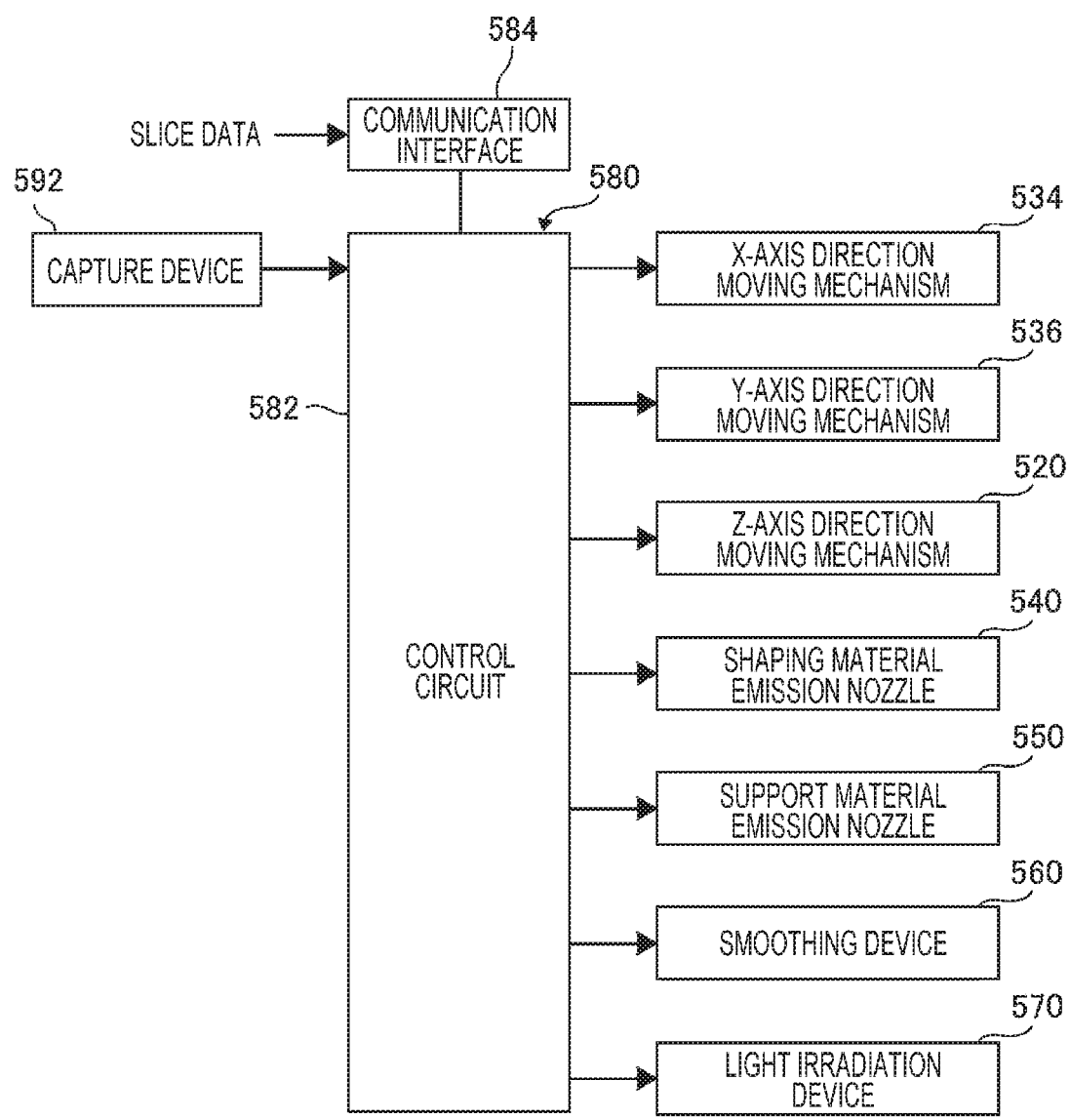
FIG. 3 is a block diagram illustrating a controller of the three-dimensional shaping device illustrated in FIG. 2.

FIG. 3 is a block diagram illustrating a controller 580 of the three-dimensional shaping device 500. As illustrated in FIG. 3, the controller 580 includes a control circuit 582. Data generated by the data generation device 100 (see FIG. 1) are input to the control circuit 582 via the network 700 (see FIG. 1) and a communication interface 584. An image captured by the capture device 592 is also input to the control circuit 582.

In the three-dimensional shaping device 500, in addition, the X-axis direction movement mechanism 534, the Y-axis direction movement mechanism 536, the Z-axis direction movement mechanism 520, the shaping material emission nozzle 540, the support material emission nozzle 550, the smoothing device 560, and the light irradiation device 570 are controlled in accordance with an output from the control circuit 582.

In the three-dimensional shaping device 500 configured as described above, the control circuit 582 causes the shaping material emission nozzle 540 to emit the shaping material toward the shaping stage 510 and causes the support material emission nozzle 550 to emit the support material toward the shaping stage 510 while causing the X-axis direction movement mechanism 534 to move the head portion 530 rightward. Then, the control circuit 582 causes the smoothing device 560 to smooth the shaping material and the support material and causes the light irradiation device 570 to cure the shaping material and the support material while causing the X-axis direction movement mechanism 534 to move the head portion 530 leftward from the right side.

When shaping is finished for a certain width in the principal scanning direction (X-axis direction), the control circuit 582 causes the Y-axis direction movement mechanism 536 to move the head portion 530 in the sub scanning direction (Y-axis direction), and causes the components to repeat shaping for a certain width in the principal scanning direction.

When shaping of the shaped object is completed for one layer by repeating the above operation, the control circuit 582 causes the Z-axis direction movement mechanism 520 to move the shaping stage 510 downward (Z-axis direction) for an amount corresponding to the thickness of one layer of the shaped object 900. Then, the control circuit 582 causes the components to shape the next layer of the shaped object 900 as laminated on the portion of the shaped object 900 which has already been shaped. By repeating the above operation, the three-dimensional shaping device 500 shapes the shaped object 900 in which layers of the cured shaping material are laminated.

Figure 4A:
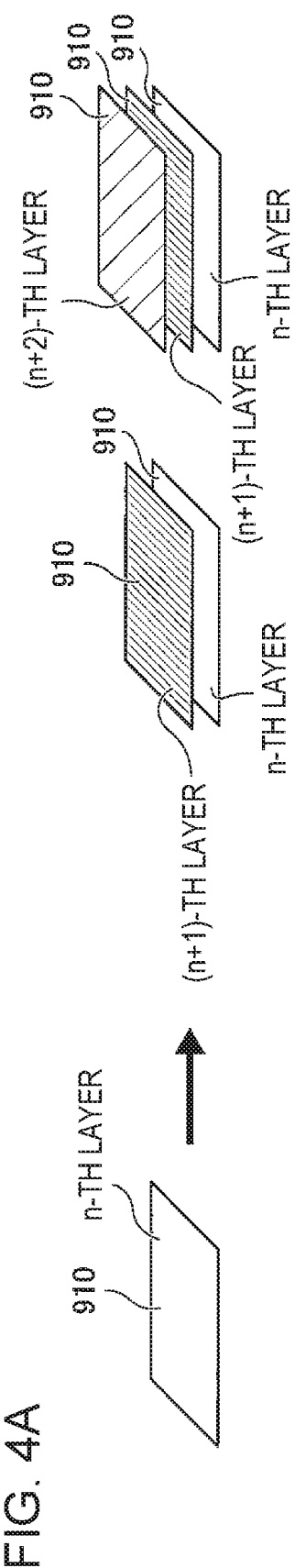
FIG. 4A illustrates a course in which a shaped object is shaped in the present invention in a chronological order, illustrating a course of lamination of a layer in which marks are not formed.
Figure 4B:
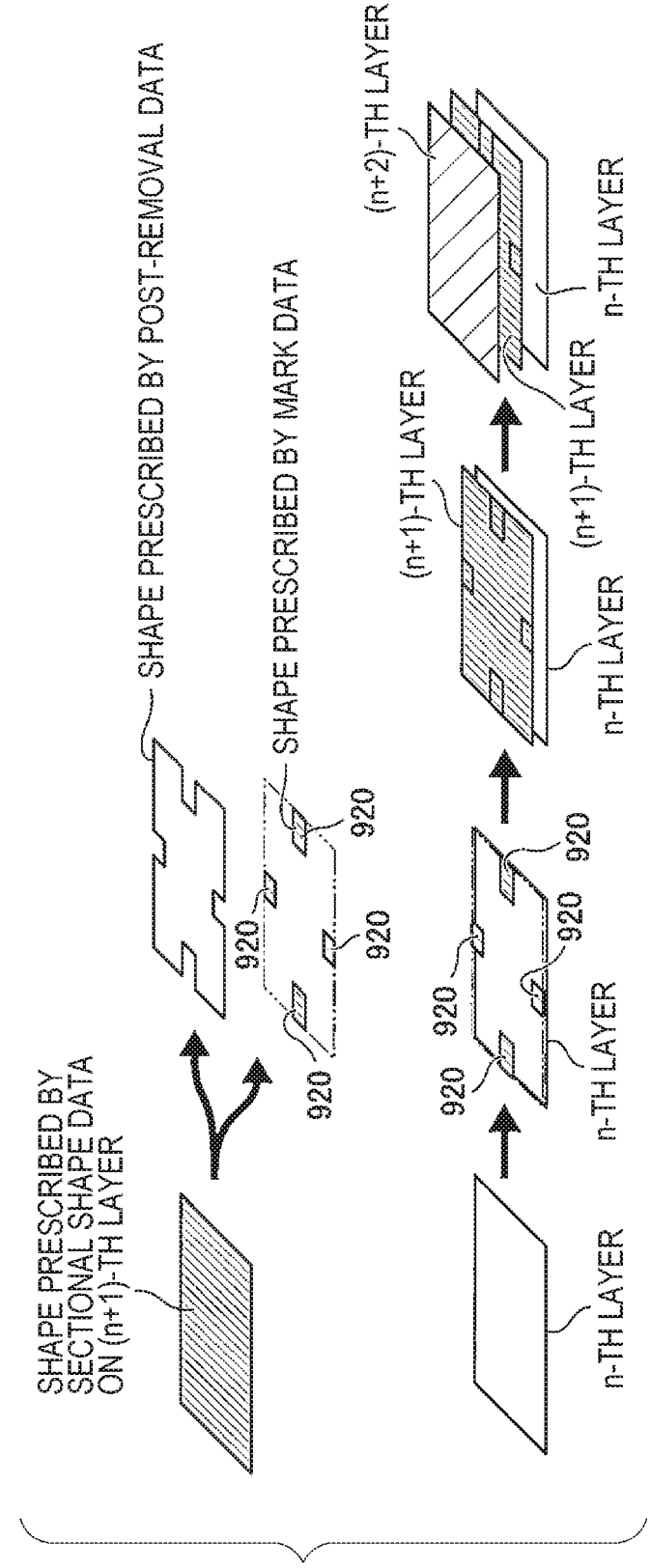
FIG. 4B illustrates a course in which a shaped object is shaped in the present invention in a chronological order, illustrating a course of lamination of a layer in which marks are formed.

FIGS. 4A and 4B illustrate a course in which the shaped object 900 is shaped. The shaped object 900 is shaped by laminating layers of the shaping material which has been cured as discussed above. That is, as illustrated in FIG. 4A, the shaped object 900 is shaped by laminating plural layers 910 such that an (n+1)-th layer 910 is laminated on an n-th layer 910 from the lowermost layer (hereinafter referred to simply as an "n-th layer"), an (n+2)-th layer 910 is further laminated on the (n+1)-th layer 910, etc.

Since the shaped object 900 is shaped by superposing the layers 910 in this way, the plural laminated layers 910 may be subjected to misregistration in directions that cross the direction in which the plural layers 910 are superposed. Therefore, in the exemplary embodiment, in order to reduce the misregistration among the plural layers 910, the positions of the layers 910 are corrected by correcting sectional shape data generated from the three-dimensional data which prescribe the shape of the shaped object 900. Adjustment of the positions of the layers 910 will be described below.

FIG. 4B illustrates the adjustment of the positions of the layers 910. Also in the example illustrated in FIG. 4B, the shaped object 900 is shaped by laminating the plural layers 910 such that the (n+1)-th layer 910 is laminated on the n-th layer 910, the (n+2)-th layer 910 is further laminated on the (n+1)-th layer 910, etc. In the example illustrated in FIG. 4B, portions of the (n+1)-th layer 910 are shaped earlier than the other portion, the portions of the (n+1)-th layer 910 shaped earlier than the other portion are defined as marks 920, and the position of the (n+2)-th layer 910 is corrected using the marks 920, for example.

That is, in the example illustrated in FIG. 4B, sectional shape data on the (n+1)-th layer of the shaped object 900 are divided into mark data for forming the marks 920 and post-removal data obtained by removing the mark data from the sectional shape data on the (n+1)-th layer of the shaped object 900. Next, a shape prescribed by the mark data is shaped on the n-th layer to shape the marks 920 on the n-th layer. Then, the marks 920 are captured by the capture device 592 (see FIG. 2) to be used to position the (n+2)-th layer. After a shape prescribed by the mark data, that is, the marks 920, is shaped on the n-th layer, a shape prescribed by the post-removal data is shaped on the n-th layer.

As described above, data on the (n+1)-th layer are divided into mark data and post-removal data, shaping using the mark data is performed earlier, and shaping using the post-removal data is performed later. After both the shaping using the mark data and the shaping using the post-removal data are completed, all the shape prescribed by the (n+1)-th sectional shape data has been shaped on the n-th layer.

FIG. 5 is a block diagram illustrating the functional configuration of the data generation device 100. As illustrated in FIG. 5, the data generation device 100 includes a three-dimensional data receiving unit 110. The three-dimensional data receiving unit 110 receives three-dimensional data. In the exemplary embodiment, the three-dimensional data receiving unit 110 receives Standard Triangulated Language (STL) data as the three-dimensional data. However, the three-dimensional data receiving unit 110 may receive three-dimensional computer aided design (CAD) data, three-dimensional computer graphics (CG) data, data from a three-dimensional (3D) scanner, or the like, and the received data may be converted into the STL data on the data generation device 100 side.

The STL data are data in an STL format, which is one of file formats for saving data that represent a three-dimensional shape. In the STL format, three-dimensional data are indicated by the coordinates of the vertexes of a large number of triangles and the normal vectors to the surfaces of the large number of triangles.

The data generation device 100 further includes a sectional shape data generation unit 112. The sectional shape data generation unit 112 converts the three-dimensional data into sectional shape data (slice data, lamination data) obtained by slicing the three-dimensional data in the horizontal direction, for example.

The data generation device 100 further includes a data division unit 114. The data division unit 114 divides data on one layer generated by the sectional shape data generation unit 112 into the sectional shape data discussed earlier and the post-removal data discussed earlier. More particularly, the data division unit 114 divides the sectional shape data on one layer of the shaped object 900 into mark data for shaping the marks 920 which are used to correct sectional shape data on a different layer to be output as superposed on the one layer discussed above and post-removal data obtained by removing the mark data from the sectional shape data on the one layer discussed above.

The data generation device 100 further includes a misregistration amount detection unit 116. The misregistration amount detection unit 116 receives an input of an image of the marks 920 captured by the capture device 592, for example, and detects the amount of misregistration of the marks 920 output using the mark data from positions determined in advance on the basis of the image captured by the capture device 592, for example.

The data generation device 100 further includes a data correction unit 118. The data correction unit 118 corrects the sectional shape data on the basis of the amount of misregistration of the marks 920 from the positions determined in advance detected by the misregistration amount detection unit 116. More specifically, the data correction unit 118 corrects the sectional shape data on the (n+2)-th layer, for example, in a similar manner to the correction of the mark data in the (n+1)-th layer, for example, which reduces the amount of misregistration of the marks 920 detected by the misregistration amount detection unit 116. The data correction unit 118 does not correct the mark data in the (n+1)-th layer, for example, which reduces the amount of misregistration of the marks 920 detected by the misregistration amount detection unit 116, but only corrects the sectional shape data on the (n+2)-th layer, for example.

The data generation device 100 further includes an output command unit 120. The output command unit 120 commands the three-dimensional shaping device 500 to make an output based on the mark data obtained through the division by the data division unit 114, make an output based on the post-removal data obtained through the division by the data division unit 114, make an output based on the data corrected by the data correction unit 118, and make an output based on the data generated by the sectional shape data generation unit 112.

Figure 6:
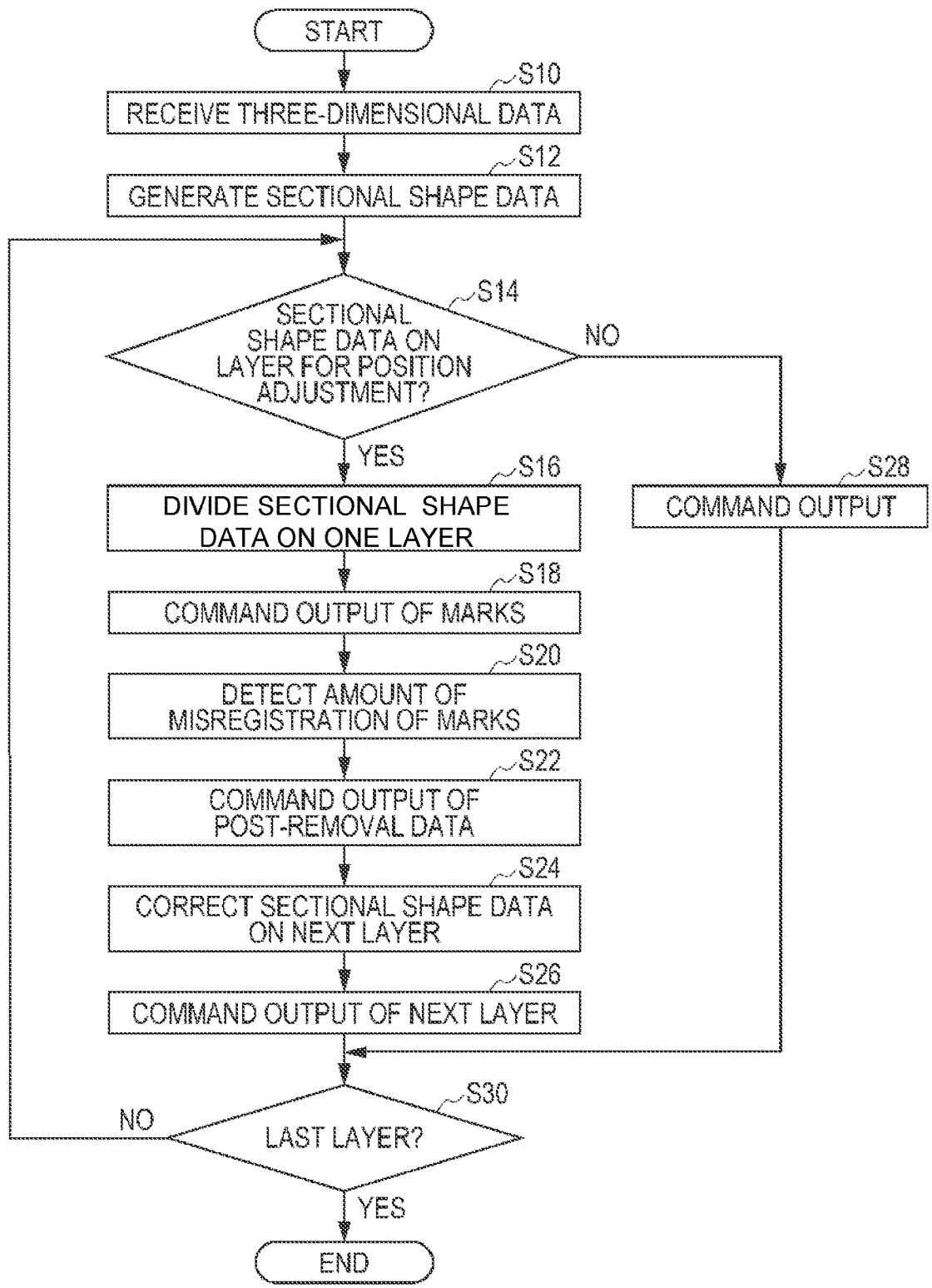
FIG. 6 is a flowchart illustrating a course followed until the data generation device illustrated in FIG. 5 commands output.

FIG. 6 is a flowchart illustrating a course followed until the data generation device 100 commands output. In step S10, which is the first step, the three-dimensional data receiving unit 110 receives three-dimensional data such as STL data, for example.

In step S12, which is the next step, the sectional shape data generation unit 112 converts the three-dimensional data to generate sectional shape data.

In step S14, which is the next step, the data generation device 100 determines whether or not the sectional shape data to be processed are sectional shape data on a layer of the shaped object 900 for position adjustment (whether or not the sectional shape data to be processed are data on a layer in which marks 920 are to be shaped). The position adjustment may be performed for every number of layers, such as ten layers, determined in advance, for example.

If it is determined in step S14 that the sectional shape data to be processed are sectional shape data on a layer of the shaped object 900 for position adjustment, the process proceeds to step S16. If not, the process proceeds to step S28.

In step S28, the output command unit 120 commands the three-dimensional shaping device 500 to make an output based on the sectional shape data generated in step S12.

In step S16, the data division unit 114 divides data on one layer generated by the sectional shape data generation unit 112 into mark data and post-removal data.

In the next step S18, the output command unit 120 commands the three-dimensional shaping device 500 to output the marks 920 using the mark data obtained through the division by the data division unit 114.

In the next step S20, the misregistration amount detection unit 116 detects the amount of misregistration of the marks 920 from the positions determined in advance on the basis of the image of the marks 920 captured by the capture device 592, for example.

In step S22, which is the next step, the output command unit 120 commands the three-dimensional shaping device 500 to make an output using the post-removal data obtained through the division by the data division unit 114.

In step S24, which is the next step, the data correction unit 118 corrects the sectional shape data on the next layer on the basis of the amount of misregistration of the marks 920 from the positions determined in advance detected in step S20. More specifically, the data correction unit 118 corrects the sectional shape data on the (n+2)-th layer, for example, in a similar manner to the correction of the mark data in the (n+1)-th layer, for example, which reduces the amount of misregistration of the marks 920 detected by the misregistration amount detection unit 116.

In the next step S30, it is determined whether or not the sectional shape data, for which a command to make an output has been given in step S26, or the sectional shape data, for which a command to make an output has been given in step S28, are on the last layer of the sectional shape data formed in step S12. If it is determined that the sectional shape data are on the last layer, the sequence of processes is ended. If not, the process returns to step S14.

Figure 7C:
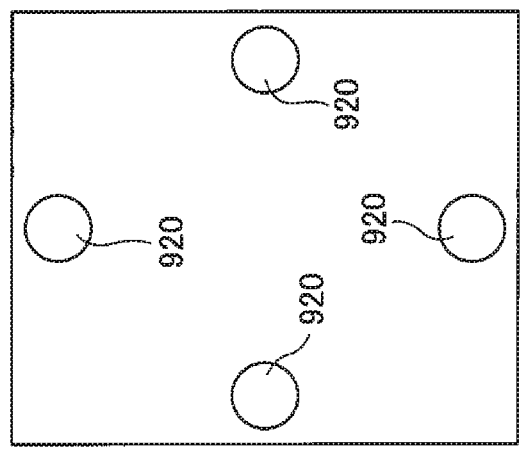
FIG. 7C illustrates a third example of the marks.
Figure 7B:
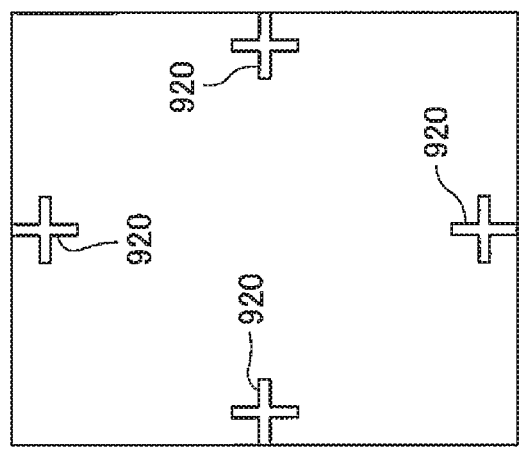
FIG. 7B illustrates a second example of the marks.
Figure 7A:
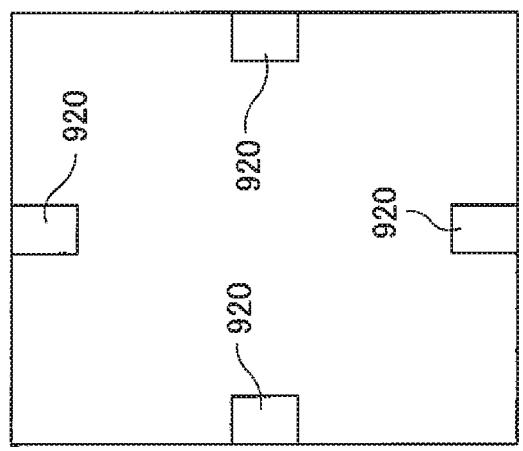
FIG. 7A illustrates a first example of the marks.

FIG. 7A illustrates a first example of the marks 920. In this example, the marks 920 have a rectangular shape, and four marks 920 are disposed on the contour side of a shape prescribed by the sectional shape data.

FIG. 7B illustrates a second example of the marks 920. In this example, the marks 920 have a cross shape, and four marks 920 are disposed on the contour side of a shape prescribed by the sectional shape data.

FIG. 7C illustrates a third example of the marks 920. In this example, the marks 920 have a circular shape, and four marks 920 are disposed on the contour side of a shape prescribed by the sectional shape data.

Figure 8A:
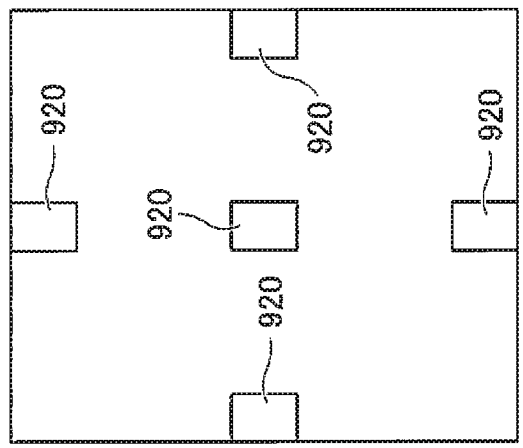
FIG. 8A illustrates a fourth example of the marks.

FIG. 8A illustrates a fourth example of the marks 920. In this example, the marks 920 have a rectangular shape, four marks 920 are disposed on the contour side of a shape prescribed by the sectional shape data, and one mark 920 is disposed on the center side of the shape prescribed by the sectional shape data.

Figure 8B:
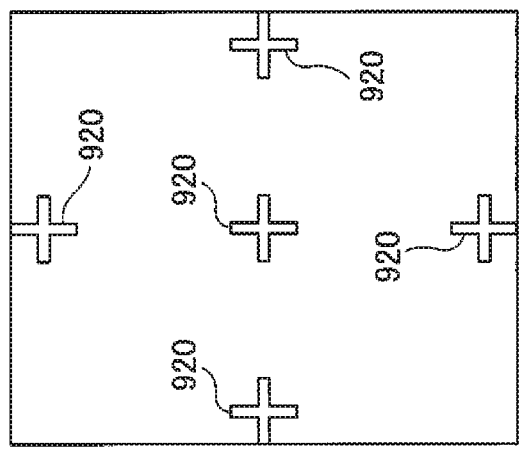
FIG. 8B illustrates a fifth example of the marks.

FIG. 8B illustrates a fifth example of the marks 920. In this example, the marks 920 have a cross shape, four marks 920 are disposed on the contour side of a shape prescribed by the sectional shape data, and one mark 920 is disposed on the center side of the shape prescribed by the sectional shape data.

Figure 8C:
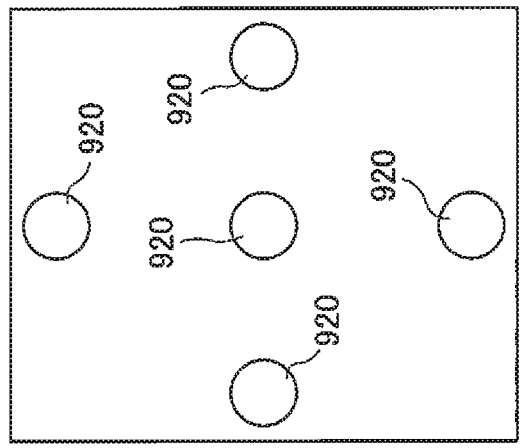
FIG. 8C illustrates a sixth example of the marks.

FIG. 8C illustrates a sixth example of the marks 920. In this example, the marks 920 have a circular shape, four marks 920 are disposed on the contour side of a shape prescribed by the sectional shape data, and one mark 920 is disposed on the center side of the shape prescribed by the sectional shape data.

FIG. 9 illustrates a first example of the shaped object 900 shaped by the three-dimensional shaping system 10 as partially enlarged. The shaped object 900 is shaped with five layers 910. The marks 920 are shaped as a part of the first layer 910. Misregistration of the second, third, fourth, and fifth layers 910 are corrected using the marks 920. In the shaped object 900, the second, third, fourth, and fifth layers 910 are shaped such that the amount of correction of the position misregistration becomes larger as the number of laminated layers counted from the first layer becomes larger.

In the case where the amount of misregistration of the marks 920 from the positions determined in advance detected by the misregistration amount detection unit 116 is larger than a predetermined amount determined in advance, as illustrated in FIG. 9, the data correction unit 118 corrects the sectional shape data on plural different layers (e.g. the second, third, fourth, and fifth layers) such that the amount of correction becomes larger as the number of laminated layers counted from one layer (e.g. the first layer) becomes larger.

Figure 10:
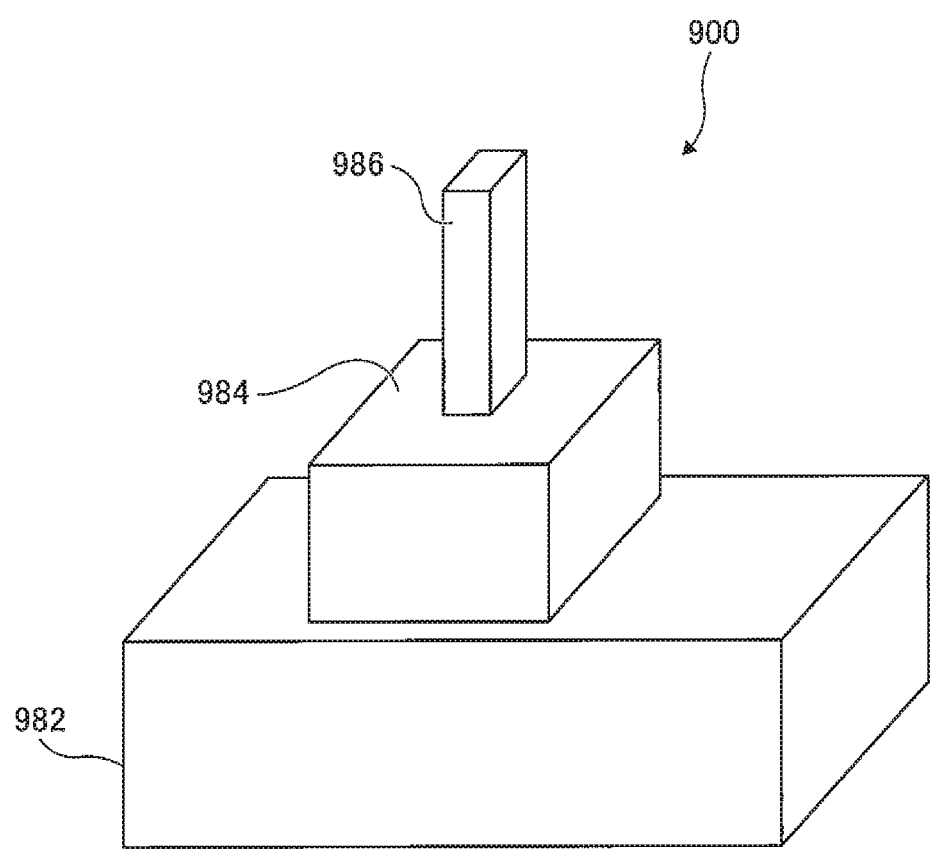
FIG. 10 illustrates a second example of the shaped object shaped by the three-dimensional shaping system illustrated in FIG. 1.

FIG. 10 illustrates a second example of the shaped object 900 shaped by the three-dimensional shaping system 10. In the shaped object 900, a middle portion 984 is shaped to be finer than a lower portion 982, and an upper portion 986 is shaped to be finer than the middle portion 984. In the shaped object 900, the amount of misregistration of the layers 910 is corrected once for every ten layers in the lower portion 982, the amount of misregistration of the layers 910 is corrected once for every eight layers in the middle portion 984, and the amount of misregistration of the layers 910 is corrected once for every six layers in the upper portion 986.

In the shaped object 900, as described above, the frequency at which the data division unit 114 divides the sectional shape data and the misregistration amount detection unit 116 detects the positions of the marks 920 differs depending on the shape of the shaped object 900. The frequency at which the data division unit 114 divides the sectional shape data and the misregistration amount detection unit 116 detects the positions of the marks 920 is higher for a portion in which the shaped object 900 is shaped to be finer.

Next, a three-dimensional shaping device 500 according to a second exemplary embodiment of the present invention will be described. In the first exemplary embodiment discussed earlier, the three-dimensional shaping device 500 constitutes the three-dimensional shaping system 10 together with the data generation device 100, and shapes the shaped object 900 on the basis of the three-dimensional data generated by the data generation device 100.

In the second exemplary embodiment, in contrast, the three-dimensional shaping device 500 generates three-dimensional data, and further shapes a shaped object 900.

FIG. 11 is a block diagram illustrating the functional configuration of the three-dimensional shaping device 500. In the second exemplary embodiment, as illustrated in FIG. 11, the three-dimensional shaping device 500 includes the three-dimensional data receiving unit 110, the sectional shape data generation unit 112, the data division unit 114, the misregistration amount detection unit 116, and the output command unit 120, which are components of the data generation device 100 in the first exemplary embodiment.

The three-dimensional shaping device 500 also includes an output unit 590. The output unit 590 outputs the shaped object 900 in response to a command received from the output command unit 120. The output unit 590 includes all the components of the three-dimensional shaping device 500 according to the first exemplary embodiment, such as the shaping stage 510 and the head portion 530, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A three-dimensional data generation device comprising:
   at least one hardware processor configured to implement:
      a data division unit that divides sectional shape data on one layer of a shaped object into mark data for shaping a mark for correction of sectional shape data on a different layer to be output as superposed on the one layer and post-removal data obtained by removing the mark data from the sectional shape data on the one layer;
      a detection unit that captures an image of a physical output of the mark and detects an amount of misregistration of the mark output using the mark data from a position determined in advance;
      an output command unit that commands output using the post-removal data so as to physically form the one layer of the shaped object together with the mark; and a data correction unit that corrects the sectional shape data on the different layer using the amount of misregistration of the mark detected by the detection unit, wherein a frequency at which the data division unit divides the sectional shape data and the detection unit detects the position of the mark differs depending on the shape of the shaped object, and the frequency at which the data division unit divides the sectional shape data and the detection unit detects the position of the mark is higher for a portion in which the shaped object is shaped to be finer.

2. The three-dimensional data generation device according to claim 1, wherein the data division unit divides the sectional shape data on the one layer such that at least two marks are shaped.

3. The three-dimensional data generation device according to claim 1, wherein the data division unit divides the sectional shape data on the one layer such that the mark is positioned on a contour side of a shape prescribed by the sectional shape data on the one layer.

4. The three-dimensional data generation device according to claim 1, wherein the data division unit divides the sectional shape data on the one layer such that the mark is positioned on each of a contour side and a center side of a shape prescribed by the sectional shape data on the one layer.

5. The three-dimensional data generation device according to claim 1, wherein the data correction unit corrects the sectional shape data on a plurality of different layers such that an amount of correction becomes larger as a number of laminated layers counted from the one layer becomes larger.

6. A three-dimensional shaping device comprising:

at least one hardware processor configured to implement:
a data division unit that divides sectional shape data on one layer of a shaped object into mark data for shaping a mark for correction of sectional shape data on a different layer to be output as superposed on the one layer and post-removal data obtained by removing the mark data from the sectional shape data on the one layer;
a detection unit that detects an amount of misregistration of the mark output using the mark data from a position determined in advance;
an output command unit that commands output using the post-removal data so as to form the one layer of the shaped object together with the mark;
a data correction unit that corrects the sectional shape data on the different layer using the amount of misregistration of the mark detected by the detection unit; and
an output unit that outputs the mark using the mark data, outputs a portion obtained by removing the mark from the one layer using the post-removal data, and outputs the different layer of the shaped object using the sectional shape data on the different layer corrected by the data correction unit, wherein a frequency at which the data division unit divides the sectional shape data and the detection unit detects the position of the mark differs depending on the shape of the shaped object, and the frequency at which the data division unit divides the sectional shape data and the detection unit detects the position of the mark is higher for a portion in which the shaped object is shaped to be finer.

7. A shaped object shaping method comprising:

dividing sectional shape data on one layer of a shaped object into mark data for shaping a mark for correction of sectional shape data on a different layer to be output as superposed on the one layer and post-removal data obtained by removing the mark data from the sectional shape data on the one layer;

detecting an amount of misregistration of the mark output using the mark data from a position determined in advance;

commanding output using the post-removal data so as to form the one layer of the shaped object together with the mark; and correcting the sectional shape data on the different layer using the amount of misregistration of the mark detected in the detecting, wherein a frequency at which the sectional shape data is divided and the position of the mark is detected differs depending on the shape of the shaped object, and the frequency at which the sectional shape data is divided and the position of the mark is detected is higher for a portion in which the shaped object is shaped to be finer.

8. A shaped object shaping method comprising:

dividing sectional shape data on one layer of a shaped object into mark data for shaping a mark for correction of sectional shape data on a different layer to be output as superposed on the one layer and post-removal data obtained by removing the mark data from the sectional shape data on the one layer;

detecting an amount of misregistration of the mark output using the mark data from a position determined in advance;

commanding output using the post-removal data so as to form the one layer of the shaped object together with the mark;

correcting the sectional shape data on the different layer using the amount of misregistration of the mark detected in the detecting; and outputting the mark using the mark data, outputting a portion obtained by removing the mark from the one layer using the post-removal data, and outputting the different layer of the shaped object using the sectional shape data on the different layer corrected in the correcting, wherein a frequency at which the sectional shape data is divided and the position of the mark is detected differs depending on the shape of the shaped object, and the frequency at which the sectional shape data is divided and the position of the mark is detected is higher for a portion in which the shaped object is shaped to be finer.

* * * * *